United States Patent [19]

Nakagaki

[11] Patent Number: 4,941,294
[45] Date of Patent: Jul. 17, 1990

[54] GRINDING MACHINE FOR BELT MATERIALS

[75] Inventor: Toshio Nakagaki, Kobe, Japan

[73] Assignee: Bando Kagaku Kabushiki Kaisha, Kobe, Japan

[21] Appl. No.: 386,973

[22] Filed: Jul. 31, 1989

[30] Foreign Application Priority Data

Sep. 16, 1988 [JP] Japan ................... 63-233356

[51] Int. Cl.$^5$ .................. B24B 1/00; B24B 7/06
[52] U.S. Cl. .................. 51/328; 51/5 C; 51/327
[58] Field of Search .......... 51/62, 143 R, 135 R, 51/215 E, 328, 5 C, 327

[56] References Cited

U.S. PATENT DOCUMENTS

| | | | |
|---|---|---|---|
| 2,712,204 | 7/1955 | Roberts | 51/135 R |
| 3,432,974 | 3/1969 | Stewart | 51/328 |
| 4,008,545 | 2/1977 | Koide et al. | 51/5 C |
| 4,292,767 | 10/1981 | Fatula | 51/145 R |
| 4,322,916 | 4/1982 | Richmond | 51/327 |
| 4,499,693 | 2/1985 | Fatula, Sr. et al. | 51/145 R |
| 4,514,937 | 5/1985 | Gehrung et al. | 51/328 |
| 4,787,178 | 11/1988 | Morgan et al. | 51/215 E |
| 4,796,387 | 1/1989 | Johnson | 51/62 |

*Primary Examiner*—J. J. Hartman
*Assistant Examiner*—Mark F. Frazier
*Attorney, Agent, or Firm*—Marshall, O'Toole, Gerstein, Murray & Bicknell

[57] ABSTRACT

The disclosure relates to a grinding machine which, in the production of toothed belts, grinds the back surface of a molded and vulcanized cylindrical belt material (also called a slab) to finish the belt material thickness to the specified dimension before the belt material is cut into belts of a desired width. The grinding machine includes a rotary support wherein a belt material to be ground is held between a work roll having a large diameter and an idler shaft having a smaller diameter, and is arranged to face a grinding belt over the contact wheel of a belt grinder in such a way that they may be brought towards and away from each other. A squeezing roll is provided on the side of the direction of rotation of the work roll, and a conforming member in the form of a conforming plate or a roll on the side of the reverse direction of the work roll, via an actuating means respectively with the contacting part of the belt material to be ground on the work roll and the grinding belt on the contact wheel in between in such a way that the squeezing roll and the conforming member may be brought into contact under pressure with the belt material to be ground.

5 Claims, 5 Drawing Sheets

GRINDING MACHINE FOR BELT MATERIALS

FIELD AND BACKGROUND OF THE INVENTION

The present invention relates to a grinding machine which, mainly in the process of producing toothed belts, grinds the back surface of a molded and vulcanized cylindrical belt material (also called a slab) to finish the belt material thickness to the specified dimension before the belt material is cut into belts of a desired width. In particular, the present invention relates to a belt material grinding machine which is well suited to grinding relatively small-sized belt materials having a small diameter (less than 100 mm).

The following prior art grinding machines have been used until now as machines for grinding the back surface of a belt material for toothed belts having a diameter of 100 mm or more:

(1) Machines (see FIG. 7 and FIG. 8) wherein a cylindrical mold 61 for molding and vulcanization of a cylindrical belt material A' is held at the centers of both ends of the mold, together with the intact molded and vulcanized belt material A' covering the outer surface of the mold, between the rotation center 62 of a headstock and the rotation center 63 of a tailstock. The grinding is effected by turning the mold and the belt material A' and at the same time forcing a grinding wheel 64 or 65 rotating in the opposite direction at the contacting part with the belt material A', to contact the back surface of the belt material A'. Grinding machines of this kind include a traverse type grinding machine (FIG. 7) wherein a grinding wheel 64 which is narrower than the width of a belt material A', traverses, while turning, in the direction of the width of the belt material A', and a plunge cutting type grinding machine (FIG. 8) wherein a grinding wheel 65 of a width which is almost identical to that of the belt material A' merely rotates.

(2) A centerless grinding machine (FIG. 9) wherein a mold 61 for molding and vulcanization, together with a cylindrical belt material A' covering the outer surface of the mold, is placed on a work rest 66, and then is held on both sides by a grinding wheel 67 and a regulating grinding wheel 68. When the mold 61 is rotated by the regulating grinding wheel 68, the grinding wheel 67 simultaneously rotates in the same direction at the contact part with the mold 61.

(3) A grinding machine (FIG. 10) wherein a work roll 69 and a tension roll 70 are rotatably arranged with a space in between, the tension roll 70 being arranged to be actuated by a pneumatic cylinder (not illustrated) in a direction S for moving away from the work roll 69. A vulcanized cylindrical belt material A', after being removed from a mold 61, is held around the work roll 69 and the tension roll 70, and then the tension roll 70 is actuated by the pneumatic cylinder to tension the belt material A'. The belt material A' is rotated by the work roll 69 and the belt material A' on the work roll 69 is ground by a belt grinding machine 71.

In the cases of the traverse type and plunge cutting type grinding machines of (1) above, the mold used in molding and vulcanizing the belt material may experience thermal deformation when it is heated and then cooled during the vulcanization of the belt material. This, in turn, may result in the loss of circularity of the mold, or the dislocation of the points to be held by the rotation centers. It, therefore, is difficult to grind the belt material with the desired accuracy of thickness over its entire length.

The amount of grinding and the load during the grinding of a belt material are greater than those of conventional grinding of metal. Therefore, in the case of the centerless grinding machine of (2) above, the machine may experience, in addition to the above-mentioned problems of the grinding machines of (1), the dislocation of the axis of the mold and, in turn, vibration. It, therefore, is much more difficult to grind the belt material with the required accuracy of thickness.

In the case of the grinding machine of (3) above, to grind a cylindrical belt material for small-sized toothed belts having a diameter less than 100 mm (usually 29 to 100 mm), the diameters of the work roll and the tension roll should be around 15 mm. The width of a belt material before cutting, however, is normally about 450 mm. Therefore, when a tension is generated in the belt material by the pneumatic cylinder, the work roll and the tension roll will bend. Furthermore, under such a condition, if the grinding belt of the belt grinding machine is forced to contact the belt material on the work roll to effect the grinding, the work roll will be bent more towards the tension roll due to the grinding resistance. The resulting belt material will be uneven in thickness. The center portion, along the width direction of the belt material, will have a greater thickness than both ends of the belt material.

The present invention was made in view of the above-mentioned points. It is intended to provide a belt material grinding machine which is particularly suitable for grinding the back surface of small-sized toothed belt materials having a diameter less than 100 mm, and also is capable of grinding a wide belt material, under conditions very close to the service conditions of the belt, to achieve a constant thickness along the width of the belt material, thus producing a belt material with a high accuracy of thickness.

SUMMARY OF THE INVENTION

A grinding machine for belt materials according to the present invention comprises a rotary support means for supporting a belt material to be ground, said support means having a rotatable work roll with a large diameter, a driving unit for rotating said work roll, and a rotatable idler shaft having a small diameter being provided at a set distance away from the work roll, said support means being arranged to support the belt material between said work roll and said idler shaft, and said support means being arranged to face a grinding belt over a contact wheel of a belt grinder in such a way that they may be brought towards and away from each other.

Further, a squeezing roll and a sliding member in the form of a conforming plate or a roll are arranged to face each other across the part of contact between the belt material to be ground over said work roll and the grinding belt on said contact wheel, said squeezing roll being on the side of the direction of rotation of the work roll, said sliding member being on the side of the reverse rotation direction of the work roll, both being provided with an actuating means so that they may be forced into contact under pressure with said belt material to be ground.

In use of the grinding machine for belt materials according to the present invention, a molded and vulcanized cylindrical belt material is placed around the work roll and the idler shaft of said rotary support means with a slight slack present in the belt material. The squeezing roll is brought into contact under pressure with a portion towards the direction of rotation (for example, the upper part) of the belt material on the work roll, and the sliding member is brought into contact under pressure with a part towards the reverse direction of rotation (for example, the lower part), both by means of the respective actuating means, to squeeze the belt material along the circumference of the work roll on the belt grinder side, and the work roll is rotated by the driving means so that the contacting part with the grinding belt of the belt grinder rotates in the opposite direction. Then said rotary support means is gradually moved toward the grinding belt on the contact wheel of the belt grinder and eventually allows the back surface of the belt material on the work roll to contact the grinding belt rotating over the contact wheel. In this way, the grinding is effected. When the thickness of the belt material reaches the preset thickness, the approach of the rotary support means towards the belt grinder is terminated. Then after the elapse of a certain time, the rotation of the belt material and the grinding belt is terminated. The belt material is thus ground to the preset thickness.

It is desirable to form tooth spaces in the circumference of said work roll, said tooth spaces matching the shape of the teeth of the toothed belt material to be ground. In this way, even if the pressing forces of the squeezing roll and of the sliding member against the toothed belt material on the work roll are reduced respectively, the toothed belt material will not slip over the work roll during grinding, and the material will be ground without fail.

BRIEF DESCRIPTION OF THE DRAWINGS

The invention will be better understood from the following detailed description of preferred embodiments of the invention, when taken in conjunction with the accompanying figures of the drawings, wherein.

DETAILED DESCRIPTION OF THE PREFERRED EMBODIMENTS

Figure 1:
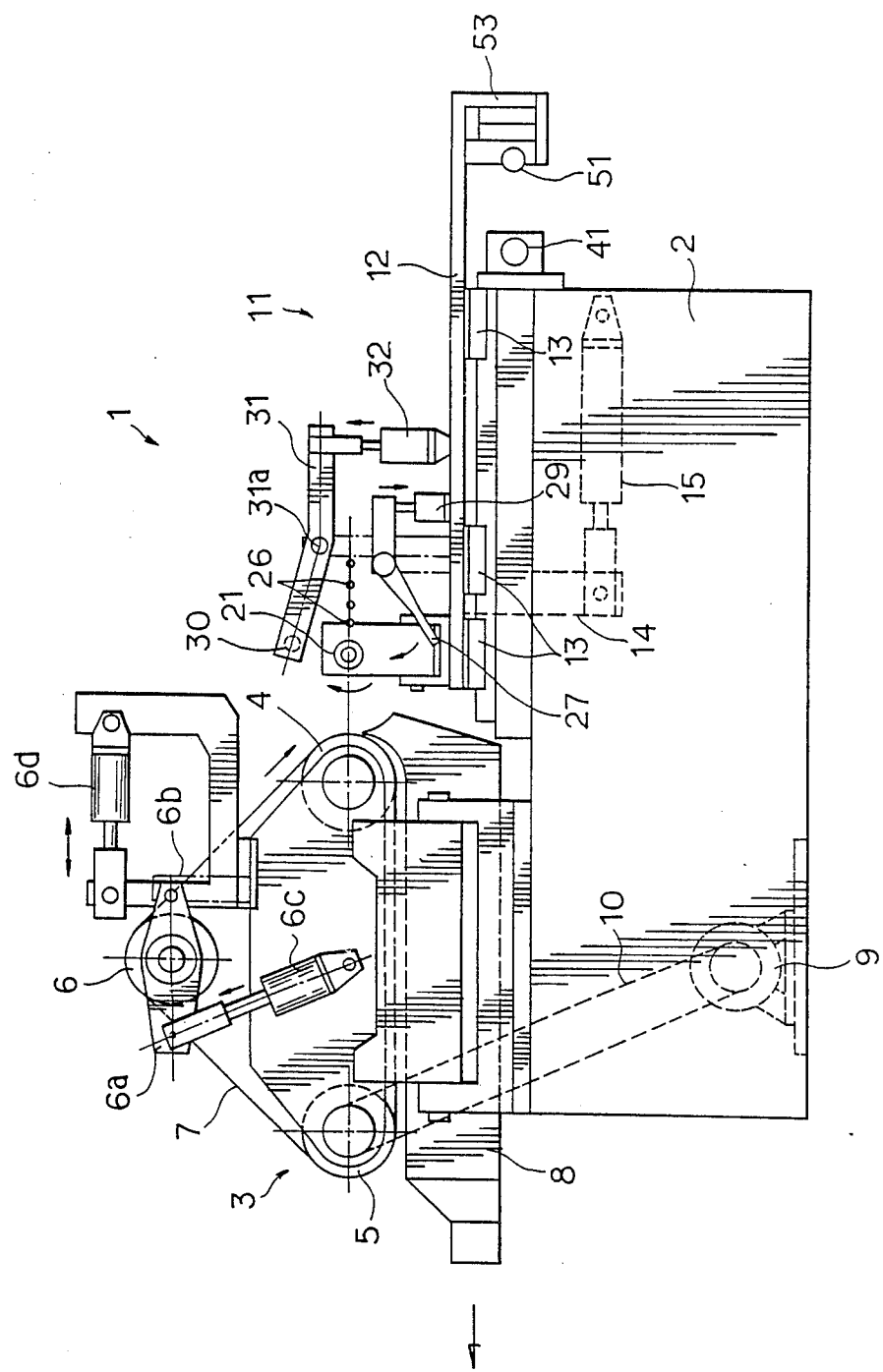
FIG. 1 is a general schematic front view of an embodiment of the grinding machine for belt materials, according to the present invention.
Figure 2:
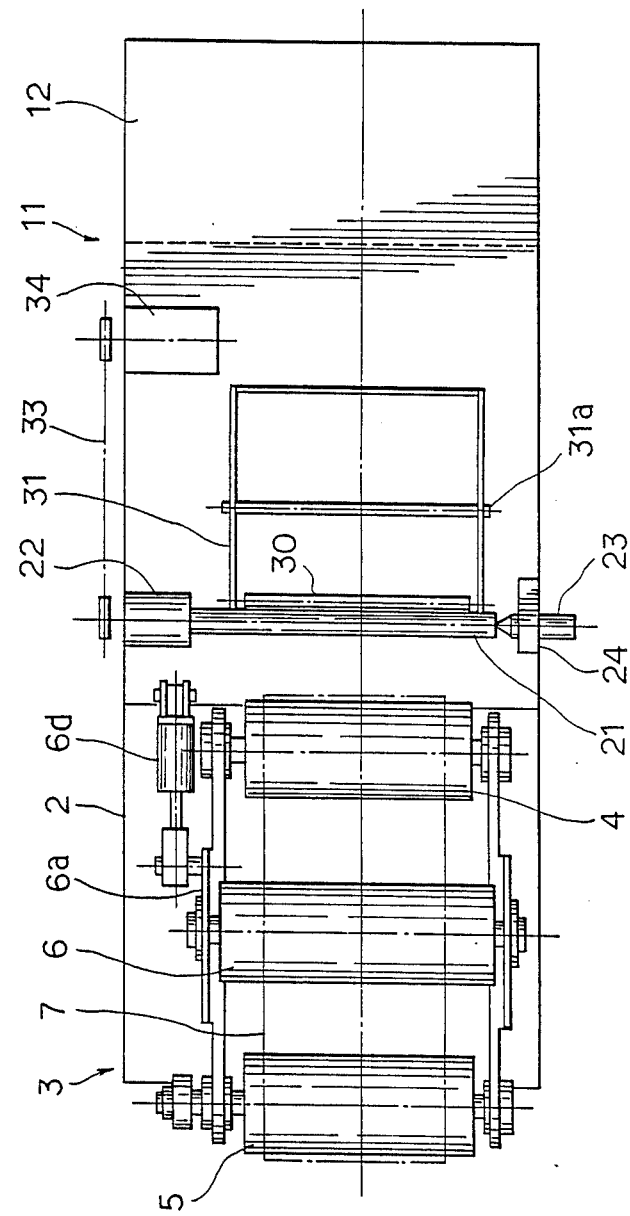
FIG. 2 is a plan view of the machine.

In FIGS. 1 and 2, a belt grinder 3 is arranged on the bed 2 of a grinding machine 1 on one side (toward the left-hand side of the figures). The belt grinder 3 is of well-known prior art construction. An abrasive cloth/paper belt 7 (also referred to as sander paper) is placed over a contact wheel 4 which is arranged near the center of the bed 2, a driving wheel 5 being arranged on one side of the bed 2, and a tension wheel 6 being arranged above a center point between both wheels 4 and 5. The contact wheel 4 and the driving wheel 5 are set at substantially the same elevation. Below both wheels 4 and 5 is provided a dust collector 8. A suction device (not illustrated) connected to one end of the dust collector 8 is arranged to suck and collect the grinding dust generated during a grinding operation. The driving wheel 5 is connected to be rotated by a driving motor 9 installed in the lower end of the bed 2 through a driving belt 10. The driving wheel 5 is, of course, rotated by the driving motor 9 during operation. The tension wheel 6 is rotatably suspended between a pair of laterally spaced brackets 6a. The brackets 6a are pivotally held by a support member 6b on one end thereof, and the other ends are connected to a tension cylinder 6c. The abrasive cloth/paper belt 7 around the belts 4-6 is arranged to be tensioned when the tension cylinder 6c is extended. Furthermore, a tracking cylinder 6d is connected to one end of one of the brackets 6a. The expanding or contracting movement of the tracking cylinder 6d sways one end of the tension wheel 6 to meander the abrasive cloth/paper belt 7. Meandering of the grinding cloth/paper belt 7 during grinding extends the life of the belt 7 and also improves the finish of a belt material A (FIG. 3) to be ground, which will be explained later.

On the other side (the right-hand side of FIGS. 1 and 2) of the bed 2, a rotary support means 11 for the belt material A is provided. The rotary support means 11 is arranged as follows.

A base 12 is arranged on the bed 2 with linear bearings 13 so that the base 12 can be moved horizontally. One end of a feed cylinder 15 provided in the bed 2 is coupled to the lower end of a support piece 14 extending downwardly from the base 12. The base 12 is arranged to move towards or away from the belt grinder 3 according to the extending or contracting movement of the feed cylinder 15.

A work roll 21 (see FIGS. 1 and 3) is arranged in one end (towards the center of the bed 2) of the base 12 to oppose the contact wheel 4 of the belt grinder 3, with the axis of the work roll being at substantially the same elevation as that of the wheel 4. One end of the work roll 21 is rotatably held, by means of bearings (not illustrated), by a support member 22 (FIG. 2) mounted one side of the base 12, and the other end of the work roll 21 is rotatably held by a rotation center 23. The rotation center 23 is mounted on a tailspindle 24 swingably supported on the base 12 by a support member (not illustrated), and the rotation center 23 is arranged to be removable from the end of the work roll 21 when a belt material A is to be mounted on the work roll 21 or removed from it.

A plurality of idler shafts 26, the outer diameters of which are considerably smaller than that of the work roll 21, are rotatably mounted at set intervals on the base 12 by means of conventional support members (not illustrated) at the ends of the shafts 26. Although not illustrated, the support member of one end of the idler shaft 26 is arranged to be removable from the idler shaft 26 when a belt material A is to be mounted or removed.

Figure 3:
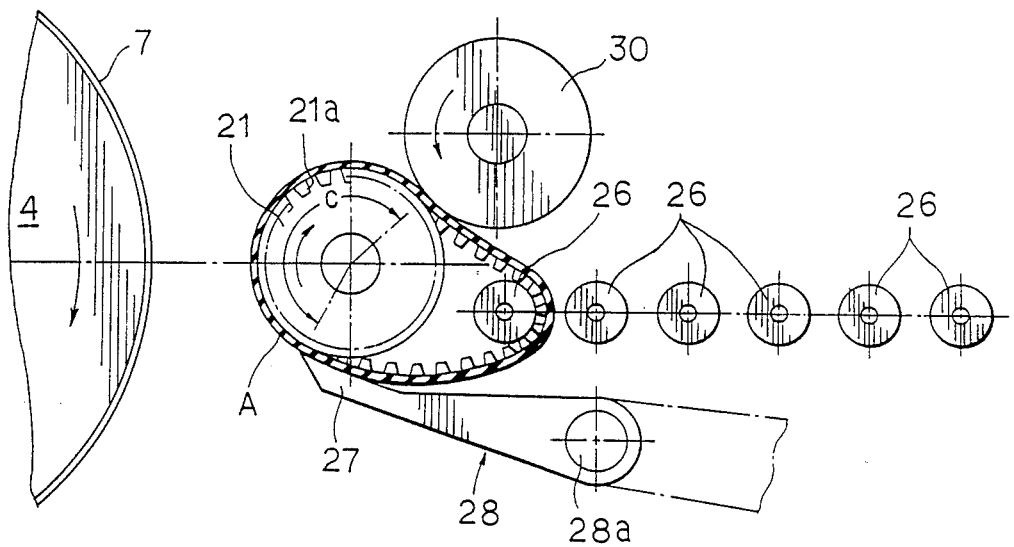
FIG. 3 is an enlarged front view of a portion near a work roll of the machine.

As shown in FIG. 3, a molded and vulcanized cylindrical belt material A is placed between the work roll 21 and the most closely adjacent idler shaft 26. In the present embodiment, the belt material A to be ground is the belt material of the smallest currently produced diameter (presently 29 mm) for small-sized toothed belts. Hence tooth spaces 21a corresponding to the teeth of the small-sized toothed belt material A are formed in the circumference of the work roll 21. A frame-shaped lever 28 with a conforming plate 27 as a sliding member attached to its outer end, the conforming plate being shaped circular to conform to the small-sized toothed belt material A on the work roll 21, is pivotally held by a pivot shaft 28a so that it can be freely moved in the vertical direction. The frame-shaped level 28 is actuated up-upwards by a pneumatic cylinder 29 (FIG. 1) which forms an actuating means to press the conforming plate 27 against the small-sized toothed belt material A at a lower part (on the opposite side of the rotation direction relative to the contact part with the abrasive cloth/paper belt 7) of the work roll 21. Furthermore, above the frame-shaped lever 28, a frame-shaped lever 31 (FIG. 1 and FIG. 2) with a rotatable squeezing or pressure roll 30 mounted on its outer end is pivotally supported by a pivot shaft 31a so that the lever 31 can be freely rotated in the vertical direction. The end of the lever 31 connected to the roll 30 is actuated downwards by a pneumatic cylinder 32 (FIG. 1) which is an actuating means to press the squeezing roll 30 against the small-sized toothed belt material A on an upper part (on the rotation direction side relative to the contact area with the abrasive cloth/paper belt 7) of the work roll 21. The work roll 21 is rotated by a driving motor 34 (FIG. 2), through a driving belt 33 and sprockets 33a. The direction of rotation of the work roll 21 is clockwise in FIGS. 1 and 3, and the direction of the rotation of the abrasive cloth/paper belt 7 of the belt grinder 3 is arranged to be reverse (clockwise) to that of the belt material A at the contact area between them. As shown in FIG. 3, when the work roll 21 is rotated, the small-sized toothed belt material A will be rotated in the clockwise direction. At the time, the conforming plate 27 is pressed against the belt material A at a lower part of the work roll 21 to control the rotation of the belt material A; further, the squeezing roll 30 is pressed against the belt material A at an upper part of the work roll 21, and the belt material A is thus squeezed along the contacting circumference of the work roll 21. The belt material A is also looped around the idler shaft 26, and there is a little slack except along the portion C contacting the work roll 21 as shown in the diagram, and this condition is close to that encountered during the service of the belts (the final products).

Figure 4:
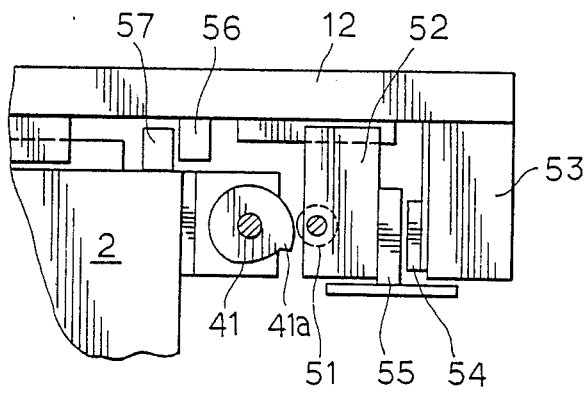
FIG. 4 is an enlarged front view of a portion near a base rear part of the machine.
Figure 5:
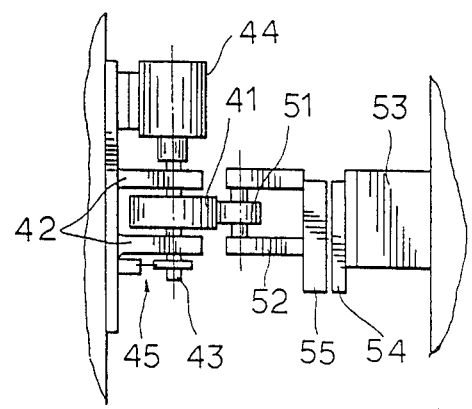
FIG. 5 is a plan view of the apparatus of FIG. 4.

In FIG. 1, a feed cylinder 15 is extended to move the base 12 towards the belt grinder 3. The belt material A will contact, under the condition of FIG. 3 described above, against the abrasive cloth/paper belt 7 on the contact wheel 4, and the grinding of its back surface will be started. In the case of a small-sized toothed belt, the amount of grinding on the back surface of the belt material A is normally very small, about 1 mm. In the present embodiment, the amount of grinding, therefore, is adjusted by means of a cam mechanism. As shown in FIGS. 4 and 5, on the bed 2, a cam 41 with a cam lobe or projection 41a of 1 mm, for example, is supported on a shaft 43 between a pair of support members 42 so that the cam can be freely rotated by the driving shaft 43, and a low-speed drive motor 44 is coupled to one end of the driving shaft 43. The low-speed drive motor 44 is arranged to be driven under so-called load control wherein the motor stops rotation when the current of the driving motor 9 of the belt grinder 3 exceeds a preset current and starts to turn when the current drops to or below the preset current. A limit switch 45 (FIG. 5) for stopping the rotation of the cam 41 is provided between the other end of the driving shaft 43 and the bed 2. On the other hand, a cam follower 51 for the cam 41 is provided on a support 52 in the lower part of the rear end of the base 12. The support 52 is suspended from the bottom surface of the base 12 in such a way that the support 52 may be moved to the left-hand and right-hand sides of the diagrams. At the rear end of the base 12, a contacting member 53 is extended downwardly, and this contacting member 53 and the support 52 are arranged to receive in between spacers 54 and 55 for adjusting the amount of grinding of the belt material A. Numerals 56 and 57 of FIG. 4 indicate stoppers. The grinding operation is started with the follower on the high point of the lobe 41a and grinding proceeds as the cam 41 is rotated clockwise as seen in FIG. 4.

The condition of use and operation of the grinding machine 1 for belt materials according to the embodiment described above will be explained as follows.

(1) A belt material A to be ground is placed between the work roll 21 and one of the idler shafts 26, the selected shaft 26 being determined by the diameter of the material A.

(2) Spacers 54 and 55 for adjusting the belt thickness are inserted between said support 52 and said contacting member 53.

(3) The abrasive cloth/paper belt 7 of the belt grinder 3 is driven clockwise (in FIG. 1) by the driving motor 9.

(4) The suction device of the dust collector is driven to collect the grinding dust.

(5) The work roll 21 is rotated by the driving motor 34 to rotate the belt material A clockwise (in FIG. 1).

(6) The pneumatic cylinder 32 is extended to press the squeezing roll 30 against the belt material A on the work roll 21, and then the pneumatic cylinder 29 is retracted to press the conforming plate 27 against the belt material A.

(7) The feed cylinder 15 is extended to bring the rotary support means 11 gradually towards the belt grinder 3.

(8) When the bearing member 51 contacts the projection 41a of the cam 41 (in this condition, the spacers 54 and 55 are in contact), the back surface of the belt material A on the work roll 21 will contact the abrasive cloth/paper belt 7 on the contact wheel 4 and the grinding will start. At the same time, the cam 41 is started to be driven clockwise (in FIG. 4) by the low-speed drive motor 44. As mentioned above, the rotation of the cam 41 is automatically controlled according to the current of the driving motor 9 of the belt grinder 3.

(9) When the belt material A has been ground to the preset thickness and the cam 41 has been turned by a certain angle, the limit switch 45 will be actuated to stop the rotation of the cam 41.

(10) For several seconds after reaching the state of (9), the grinding of the belt material A is continued. Then the feed cylinder 15 is quickly contracted to restore the rotary support means 11 away from the belt grinder 3 to the original position.

(11) The pneumatic cylinder 32 is contracted and the pneumatic cylinder 29 is extended to separate the squeezing roll 30 and the conforming plate 27 from, the belt material A on the work roll 21, respectively. Then the rotation of the belt material A is terminated. At the same time, the rotation of the abrasive cloth/paper belt 7 of the belt grinder 3 is terminated. The operation of the suction device of the dust collector 8 is also terminated. Furthermore, the cam 41 is rotated to restore it to the initial position.

(12) Lastly, the ground belt material A is removed from the work roll 21 and the idler shaft 26 to complete the grinding operation.

Figure 6:
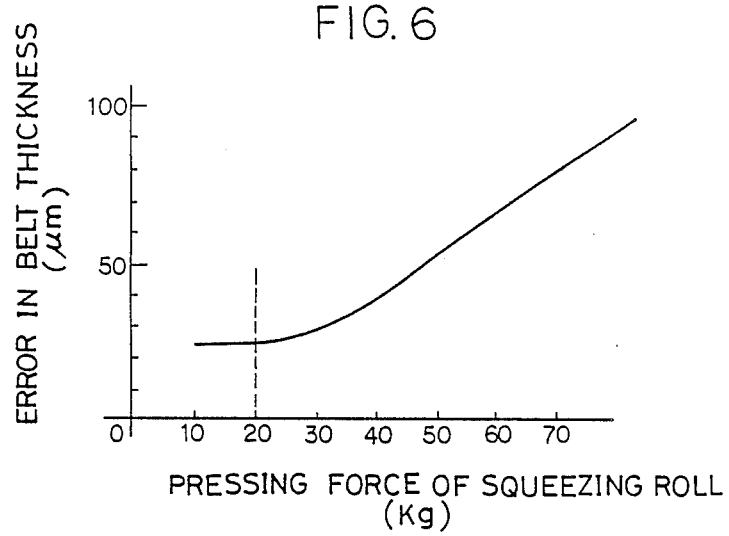
FIG. 6 is a graph showing the relationship between the pressing force of, the squeezing roll against the belt material and the accuracy of the belt thickness.
Figure 7:
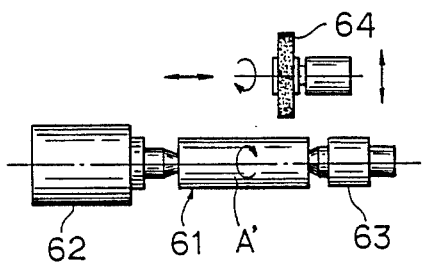
FIG. 7 is a schematic plan view of a conventional traverse type grinding machine.
Figure 8:
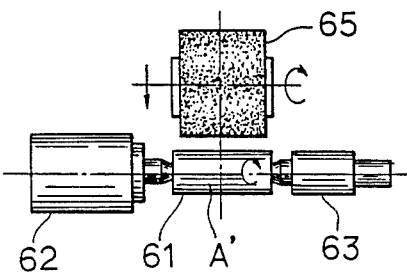
FIG. 8 is a schematic plan view of a conventional plunge cutting type grinding machine.
Figure 9:
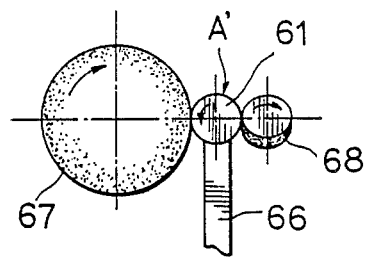
FIG. 9 is a schematic front view of a conventional centerless grinding machine.
Figure 10:
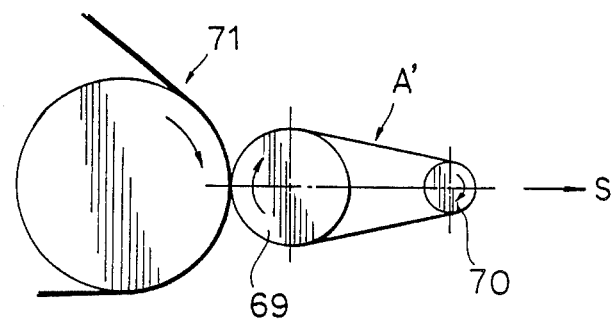
FIG. 10 is a schematic front view of a conventional belt material grinding machine of double shaft type.

FIG. 6 is a graph indicating the relationship between the pressing force of the squeezing roll 30 against the belt material A and the thickness accuracy of the belt material A (when the width of the belt material A is 450 mm). As clearly seen in the diagram, when the pressing force of the squeezing roll 30 is 20 kg or less, the error of the thickness of the belt material A is very small or about 25 μm. It, therefore, is desirable to set the pressing force of the squeezing roll 30 at or less than 20 kg.

In the above-mentioned embodiment, the confirming plate 27 is used as a sliding member. A roll of controlled rotation, however, may be used in place of the conforming plate 27. Although tooth spaces 21a corresponding to the teeth for the small-sized toothed belt material A are formed in the circumference of the work roll 21, such tooth spaces 21a can be dispensed with. In the case of the above-mentioned embodiment, a small-sized toothed belt material A is used for the purpose of explanation. The present invention, however, is also applicable to the grinding operation of toothed belt materials with a diameter of 100 mm or over, and of toothless belt materials. Larger diameters of belt material are looped around a shaft 26 at the appropriate distance from the roll 21. If the direction of rotation of said work roll 21 is opposite (counterclockwise in FIG. 1) to that of the above-mentioned embodiment the pressing positions of the squeezing roll 30 and the conforming plate 27 will be reversed upside down.

As will be clearly understood from the description above, the grinding machine for belt materials according to the present invention has the following effects and advantages:

(1) Although idler shafts 26 are provided as a supplement, the machine according to the present invention is arranged to hold a belt material to be ground on the work roll mainly by pressing the squeezing roll and the sliding member against the belt material. The belt material, therefore, is free from the tension, and the grinding machine is, in principle, of a single shaft type. This allows the use of a work roll with a diameter greater than those of the conventional double-shaft type machines. Moreover, the work roll is free from the tension in contrast with the conventional double-shaft machines. The work roll, therefore, will not bend even when a very small-sized belt material is to be ground, accomplishing grinding of high accuracy.

(2) The effect of (1) above enables the grinding machine to grind small-sized belt materials of the minimum diameter (presently 29 mm).

(3) As the grinding is made on a belt material which has been removed from a mold used for molding and vulcanization, the grinding is not influenced by the dimensional accuracy of the mold, and the mold is not damaged by grinding.

(4) The use of a belt grinder raises the grinding efficiency in comparison with the use of a grinding wheel, and in turn the grinding time is reduced.

(5) With the use of the grinding machine, even when the pressing forces of the squeezing roll and the sliding member against a toothed belt material on the work roll are reduced, the toothed belt material will not slip over the work roll during grinding. Thus proper grinding is assured.

What is claimed is:

1. A grinding machine for belt materials comprising a rotary support means for supporting a belt material to be ground, said support means having a rotatable work roll with a large diameter, a driving unit for rotating said work roll in a direction of rotation, and at least one rotatable idler shaft being provided at a predetermined distance away from the work roll, said support means being arranged to support the belt material between said work roll and said idler shaft, and said support means being arranged to face a grinding belt over a contact wheel of a belt grinder and including movement means whereby said support means and said grinding belt may be brought towards and away from each other at a point of contact, and a squeezing roll and conforming means mounted adjacent said support means and arranged to face each other on opposite sides of said point of contact between the belt material to be ground over said work roll and the grinding belt on said contact wheel, said squeezing roll being past said point of contact in said direction of rotation of the work roll, said conforming means being prior to said point of contact in said direction of rotation of the work roll, each being provided with an actuating means so that they may be forced into contact under pressure with said belt material to be ground.

2. A grinding machine for belt materials described in the claim 1 wherein tooth spaces corresponding to the tooth shape of a toothed belt material to be ground are provided in the circumference of said work roll.

3. A grinding machine as described in the claim 1, wherein said conforming means comprises a sliding member.

4. A grinding machine as described in the claim 1, wherein said conforming means comprises a roll.

5. A grinding machine for belt material using a grinding belt on a contact wheel of a belt grinder, comprising a rotary support means for supporting a belt material to be ground, said support means having a rotatable work roll with a large diameter, a driving unit for rotating said work roll, and at least one rotatable idler shaft at a predetermined distance away from said work roll, said support means being arranged to support the belt material on said work roll and said idler shaft facing said grinding belt, said support means being movably mounted relative to said belt grinder for mutual approximation or withdrawal, and a squeezing roll and a conforming means arranged to face each other across the point of contact between the belt material to be ground on said work roll and said grinding belt on said contact wheel, said squeezing roll being located past said point of contact in the direction of rotation of said work roll and said conforming means being located ahead of said point of contact in the direction of rotation of said work roll, and said squeezing roll and said conforming means each being provided with an actuating means for movement into contact under pressure with said belt material to be ground.

* * * * *